Nov. 4, 1941.  O. M. JAMES  2,261,849
BASKET COVER
Filed May 26, 1939  2 Sheets-Sheet 1
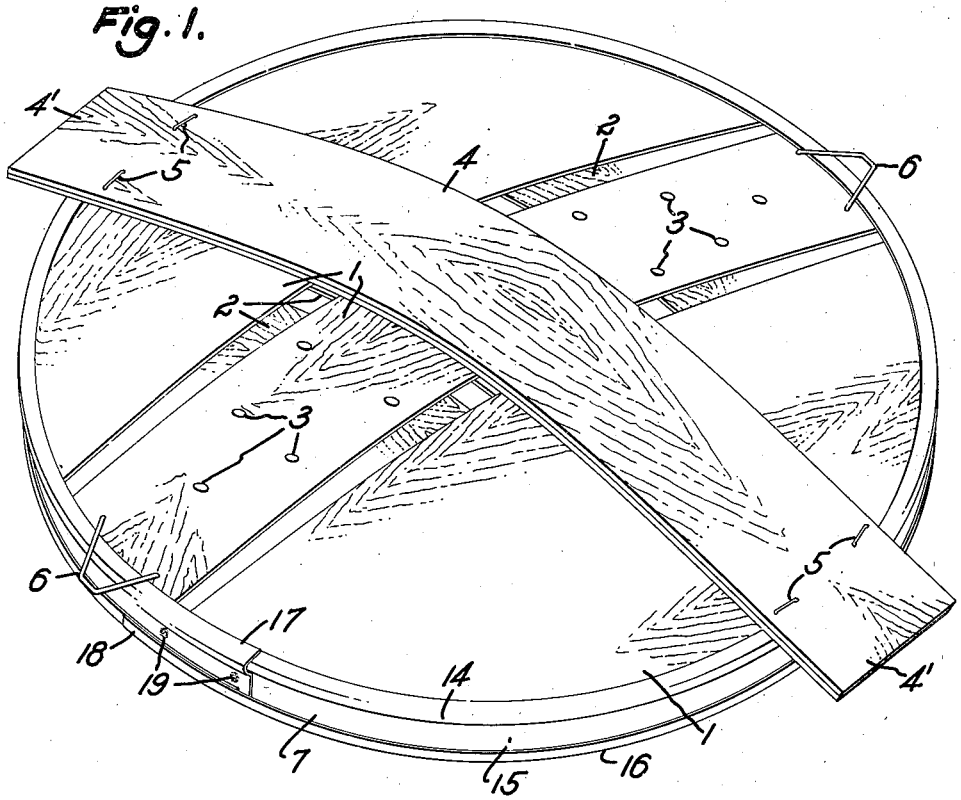
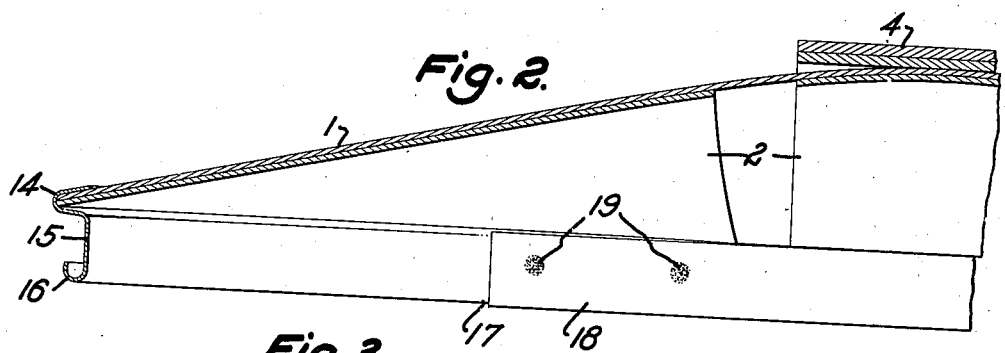
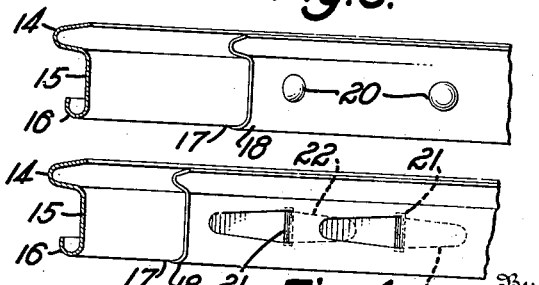
Inventor
Oliver Matthew James
Attorney Nov. 4, 1941.  O. M. JAMES  2,261,849
BASKET COVER
Filed May 26, 1939  2 Sheets-Sheet 2
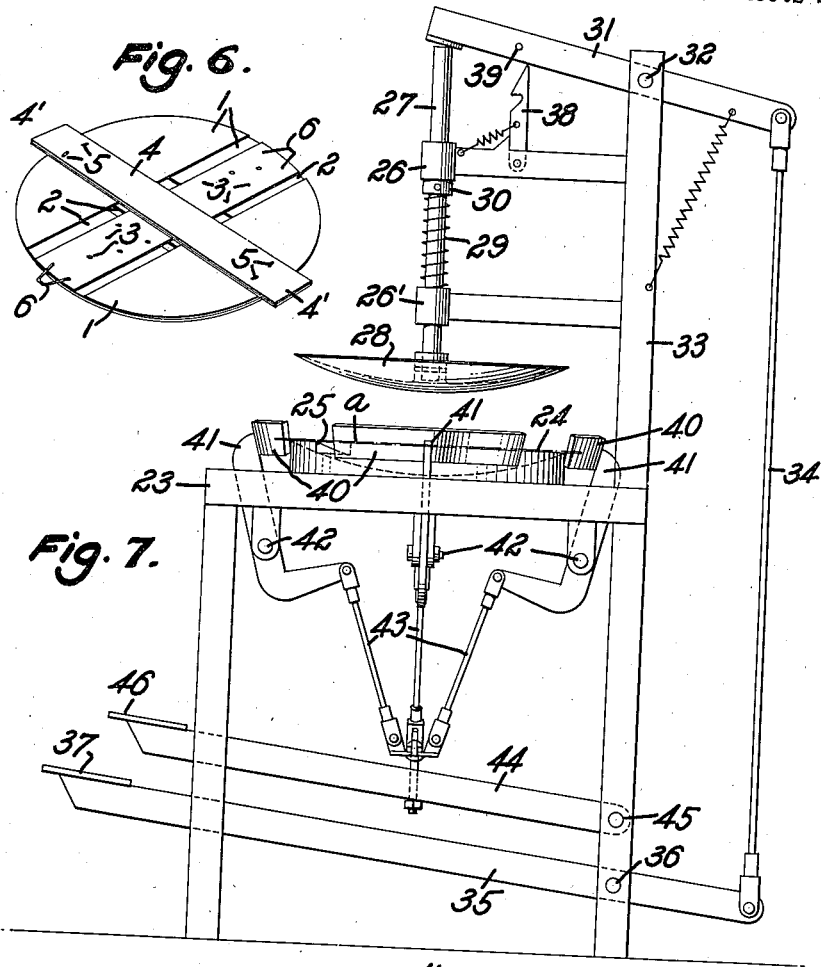
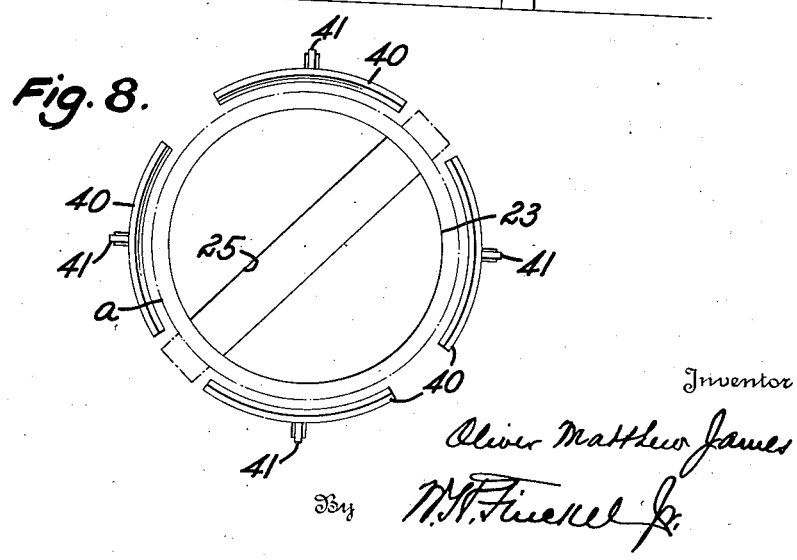
Inventor
Oliver Matthew James
By W. H. Finckel Jr.
Attorney Patented Nov. 4, 1941

2,261,849

UNITED STATES PATENT OFFICE 2,261,849

BASKET COVER

Oliver Matthew James, Americus, Ga., assignor to Dayton Veneer & Lumber Mills, Dayton, Tenn., a corporation of Tennessee Application May 26, 1939, Serial No. 275,969

4 Claims. (Cl. 217—124)

This invention relates to basket covers, and it has particular reference to basket covers provided with metallic rims.

Reference is made to my copending application for patent for Method and apparatus for making basket covers and covers produced thereby, filed May 31, 1939, Serial No. 276,748.

It is the present practice, particularly in the packaging of fruits and the like in baskets, to produce what is termed a "full" or "bulge" pack, in which the fruit extends, particularly in the center, above the rim of the basket, so that, during handling or transit, settling of the basket contents will not result in an appearance of deficiency in the fullness of the basket. With such a pack it is inexpedient to use the ordinary flat basket cover for the reason that the central portion, particularly, of this cover will press upon the packed basket contents and bruise it. It has therefore become customary to provide crowned covers the concavo-convex form of which will substantially conform to the full or bulge pack of the basket contents without unduly pressing against such contents.

Covers of this type as now generally constructed are provided with a wooden rim underlying the cover and to which the parts of the cover are appropriately fastened as by nailing or stapling. Such wooden rimmed crowned covers do not have the rigidity essential to produce the greatest security of the package and, moreover, the lower edge of the wooden rim is apt to mar the contents of the basket when the cover is applied, and the cover may, furthermore, become distorted to such an extent that the wooden rim fails to seat properly upon the upper edge of the basket. Also, it is extremely difficult, if not impossible, to make all of the staples or nails by which the cover is attached to the rim properly engage the rim so as to be enclosed thereby. In fact, more often than not the points or parts of some of such nails or staples will protrude or run out on the inside of the rim or cover, or upon the outside of the rim, producing what is known in the basket trade as "shiners," and these shiners are apt to injure the basket contents.

One object of the invention is to provide a cover formed of a mat preferably comprising a plurality of appropriately associated veneer strips and cut to circular form, to the peripheral edge of which mat is applied a metallic rim member of such form as to provide a smooth bearing edge for contact with the top edge of the basket and of such strength as to hold the cover mat permanently in bulged or crowned shape and to prevent distortion of the cover either during its application to the packed basket or when other packed baskets are stacked upon it. Thus injury to the basket contents is guarded against, even when the same are in such full or bulge pack as to be in contact with the cover throughout its under surface.

With the foregoing and other objects and advantages in view, as will appear from the following detailed description, the invention contemplates a basket cover comprising a cover mat, and a metallic rim member embracing the edge of this cover mat and provided with an inwardly opening bead for receiving and confining such edge, the mat being outwardly bulged or crowned and thus maintained by the applied rim member, the rim member preferably including a depending flange serving to support the cover upon a basket and the lower edge of such flange being rolled to provide a smooth edge surface, all as will be explained hereinafter more fully and finally claimed.

In the accompanying drawings illustrating the invention, in the several figures of which like parts are similarly designated, Figure 1 is a perspective view of a bulged or crowned cover embodying the features of the invention.

Fig. 2 is an enlarged fragmentary diametrical section thereof.

Figs. 3 and 4 illustrate alternative means of attaching the overlapped ends of the rim member.

Fig. 5 illustrates another cross sectional shape of rim member.

Fig. 6 is a perspective view, on a reduced scale, of the finished cover mat before application of the rim thereto.

Fig. 7 is a side view of apparatus suitable for assembling the cover mat and rim member, and Fig. 8 is a fragmentary plan view of the lower cover supporting member of the apparatus and appropriate rim embracing means therefor.

The finished cover of the invention, as illustrated in Figs. 1 and 2, includes a cover mat formed of a plurality of appropriately arranged superposed strips of veneer or other proper material preferably furnished in an upper layer 1 and a lower layer 2 appropriately secured together by means of nails 3, staples or the like. This mat is trimmed preferably to circular shape, as illustrated in Fig. 6, and its two layer formation preferably provides substantially continuously of its peripheral edge a double thickness as illustrated particularly in Figs. 2 and 6. Arranged substantially diametrically of the upper surface of the mat is a handle slat 4 fastened to the mat adjacent to its ends by staples or other appropriate fastening means 5, the ends 4' of the handle slat extending beyond the peripheral edge of the cover mat and providing the customary means for engagement with the basket handles to hold the cover in place upon the basket. Affixed to the mat adjacent to its edges and preferably on a diametrical axis substantially at right angles to the handle slat are the customary wire or other fastening loops 6.

After the mat has been made up in this form, and in flat condition, as illustrated in Fig. 6, it is ready to have the metallic rim 7 applied to it. This rim may take a variety of shapes in cross section, two of such shapes being illustrated in Figs. 2 and 5 as preferable.

In its preferred form, as illustrated particularly in Figs. 1 to 4 the metallic rim material comprises a body having an inwardly opening bead 14 for receiving the edge of the cover mat, as illustrated in Fig. 2, and a depending flange 15 having an outwardly and upwardly rolled lower edge 16 providing a smooth bearing surface for the rim.

After its application to the cover mat, as will be hereinafter more fully described, the overlapping ends 17, 18 of the rim may be connected together by spot welds 19, as shown in Figs. 1 and 2, or fastened by rivets 20 as shown in Fig. 3, or they may be provided with coacting slots 21 and bendable tongues 22 as illustrated in Fig. 4.

As shown in Fig. 5, the outwardly and upwardly rolled edge 16' of the flange 15 may be in the form of a circular bead if desired, this providing additional circumferential strength to the rim and guarding further against injury to the basket contents or to the hands of the packer.

Having provided a cover mat of the form illustrated in Fig. 6, one method of suitably applying the metallic rim thereto is substantially as follows: The cover mat is appropriately bulged outwardly to concavo-convex or crowned shape, as it appears in Fig. 1. Then, having provided an appropriate length of the metallic rim material formed to suitable cross sectional shape, and having a suitable longitudinal curvature, this strip is applied around the periphery of the mat with the peripheral edge of the mat embraced within the inwardly opening bead 14, and is drawn into intimate engagement with the peripheral edge of the mat so that its ends 17 and 18 overlap in substantially telescoping engagement. These ends are then appropriately spot welded or riveted, as shown in Figs. 2 and 3, or otherwise suitably connected, as by the tongues and slots illustrated in Fig. 4, to maintain the rim in rigid intimate engagement with the edge of the cover mat. Thereafter, when the bulging pressure upon the mat is relieved, the rim will maintain the mat in bulged or crowned shape and the tendency of the mat to reassume its flat form will produce such pressure of its edge within the bead 14 as to preclude the possibility of escape of the mat from the rim under normal conditions. Moreover, pressure applied to the upper surface of the cover thus formed will tend to increase the grip of the rim upon the mat edge.

It will be noted that the upper lip of the bead 14 which overlies the upper surface of the mat edge will extend between the mat and the offstanding ends 4' of the handle slat 4, thus adding security to the assembly of the mat with the rim.

This method of assembling the rim upon the cover mat makes possible completion of the cover mat, including its handle slat 4 and attaching loops 6, before application of the rim member, and tends to facility and speed in the formation of the complete covers.

Numerous types of apparatus may be provided for performing the steps of the method just described. One form of such apparatus, which has proven satisfactory in service, is illustrated in Figs. 7 and 8, and includes a table or other bed means 23 carrying a vertically projecting ring or dished die 24 constituting a support upon which the flat cover mat may rest as indicated in broken lines a. This ring or dished die is provided with a notch or recess 25 to receive the handle slat 4 of the mat.

In vertical axial alignment with the center of the member 24 there is supported in slide bearings 26, 26' a reciprocable shaft 27 carrying a convex disk or plate 28 of a curvature substantially conforming to the bulged or crowned shape of the finished cover and normally held in retracted or raised position by means of a spring or the like 29 bearing at one end against the lower slide bearing 26' and at its upper end against a collar 30 fixed to the shaft 27. The shaft 27, and hence the disk 28, may be depressed by means of a rocker arm 31 pivoted at 32 in a stand 33 and connected by a link 34 with a treadle lever 35 pivoted at 36. Pressure upon the treadle 37 of the lever 35 will force the disk 28 downwardly upon the cover mat supported by the member 24 and will cause it to be pressed to concavo-convex shape substantially conforming to the curvature of the disk 28, the handle slat 4 meanwhile having its ends free to separate somewhat from the periphery of the mat by virtue of the reception of the handle slat in the recess 25. Upon completion of its downward pressure-applying movement, the disk 28 may be locked in its pressure-applying position by cooperation of a spring pressed latch 38 with a pin 39 carried by the lever 31, thus holding the cover mat in this concavo-convex form with its edge extending beyond the edge of the support 23 and in condition to receive the metallic rim member which may now be applied. The section of rim material which is ready to hand is arranged around the edge of the cover mat with its inwardly opening bead 14 embracing such edge, its flange upstanding, and its ends overlapped. Then uniform pressure may be applied throughout the circumferential extent of the rim by means of a plurality of pressure-applying members 40 carried by lever arms 41 pivoted at 42 and connected by links 43 with a treadle lever 44 pivoted at 45, so that when pressure is applied to the treadle 46 of the lever 45 the pressure-applying members 40 will simultaneously be brought into engagement with the rim member thus appropriately positioned and will force it into uniform intimate engagement with the edge of the cover mat. While the rim member is thus held engaged, its overlapping ends may be welded, riveted, or otherwise rigidly connected, and thereafter the treadle 46 and latch 38 may be released and the finished cover removed.

Obviously, instead of using a plurality of pressure-applying members 40 such as those illustrated, a contractible band or the like may be employed for accomplishing the same purpose. However, the separate simultaneously operable pressure-applying members 40 make possible greater ease of manipulation of the cover, and particularly facilitate the welding, riveting or other appropriate operation necessary to connect the overlapping ends of the rim member.

It will be noted that the area of the plunger operated pressure-applying disk 28 and of the support 24, in contact with the cover mat, is less than the area of the cover mat, even when the latter is pressed to concavo-convex form, and hence the edge of the mat stands free of the edges of the disk and support, thus making possible easy application of the rim member to the mat edge. Also, the slight separation of the ends 4' of the handle slat 4 from the surface of the cover mat, when pressure is applied, facilitates reception of the outer lip of the bead 14 of the rim member between the adjacent faces of the handle slat and cover mat.

From the foregoing it will be apparent that covers constructed in accordance with the invention have characteristics of strength and ability to retain their shape during service not heretofore attained in basket covers, particularly those made entirely of wood. Moreover, the metal rim makes possible provision of greater space within its confines than may be attained with covers using wooden rims. Furthermore, the outwardly turned or rolled lower edge of the rim flange reduces "rim cut" of the basket contents to the minimum as it is perfectly smooth and thus eliminates the sharp and jagged edges often present in wooden rims.

Obviously, the pressure applied to the cover mat prior to the assembly of the metallic rim member thereon will necessarily be in excess of any to which it might be subjected in service upon a packed basket, and therefore the likelihood of the mat edge escaping from beneath the upper lip of the bead 14 in service is extremely remote, and in fact negligible.

Various changes and modifications are considered to be within the spirit of the invention and the scope of the following claims.

What I claim is:

1. A basket cover, comprising a cover mat, and a metallic rim member embracing the edge of said mat, said rim member comprising a substantially cylindrical body having at one edge an inwardly opening bead for receiving and confining the mat edge, and its other edge being rolled to provide a smooth surface for supporting the cover upon the basket, the mat being outwardly bulged and thus maintained by said rim member.

2. A basket cover, comprising a cover mat, and a metallic rim member embracing the edge of said mat, said rim member comprising a substantially cylindrical body having at one edge an inwardly opening bead for receiving and confining the mat edge, the body constituting a depending flange and having its other edge provided with an outwardly rolled bead to support the cover upon the basket, the mat being outwardly bulged and thus maintained by said rim member.

3. A basket cover, comprising a cover mat, and a metallic rim member substantially of S cross-section embracing the edge of said mat, said rim member having an inwardly opening bead for receiving and confining the mat edge, and a depending flange serving to support the cover upon the basket, said flange terminating in an outwardly-rolled edge, the mat being outwardly bulged and thus maintained by said rim member.

4. A basket cover, comprising a cover mat, a handle slat affixed to said mat substantially centrally thereof and extending past the edges of the mat adjacent to the slat ends, and a metallic rim member embracing the edge of said mat, said rim member having an inwardly opening bead for receiving and confining the mat edge, said rim member having a part extending between said mat and handle slat, the mat being outwardly bulged and thus maintained by said rim member, and the extension of said rim member between the mat and handle slat serving as an additional means for maintaining assembly of said mat and rim member.

OLIVER MATTHEW JAMES.